(12) United States Patent
Tent

(10) Patent No.: US 6,892,649 B2
(45) Date of Patent: May 17, 2005

(54) TRANSPORTATION SYSTEM WITH LINEAR MOTOR

(76) Inventor: Berend Tent, Brinkkampen 1, NL-7751 ZG Dalen (NL)

( * ) Notice: Subject to any disclaimer, the term of this patent is extended or adjusted under 35 U.S.C. 154(b) by 0 days.

(21) Appl. No.: 10/397,535

(22) Filed: Mar. 27, 2003

(65) Prior Publication Data

US 2004/0016360 A1 Jan. 29, 2004

Related U.S. Application Data

(63) Continuation of application No. PCT/NL01/00681, filed on Sep. 14, 2001.

(30) Foreign Application Priority Data

Sep. 27, 2000 (NL) .............................................. 1016282

(51) Int. Cl.$^7$ ................................................. B61J 3/00
(52) U.S. Cl. ..................................... 104/88.01; 104/287
(58) Field of Search ......................... 104/88.01, 88.02, 104/88.03, 130.07, 130.09, 288, 292, 282, 287, 290, 295, 296, 293, 18, 20; 310/12; 318/135

(56) References Cited

U.S. PATENT DOCUMENTS

| | | | |
|---|---|---|---|
| 3,802,348 A | | 4/1974 | Guimbal |
| 3,911,828 A | | 10/1975 | Schwarzler |
| 4,299,173 A | * | 11/1981 | Arima et al. ................ 104/284 |
| 5,333,553 A | * | 8/1994 | Matsui et al. ............... 104/290 |
| 5,551,350 A | * | 9/1996 | Yamada et al. ............. 104/293 |
| 5,684,344 A | * | 11/1997 | Takei ........................... 310/12 |
| 5,927,657 A | * | 7/1999 | Takasan et al. ............. 246/194 |
| 6,075,297 A | * | 6/2000 | Izawa et al. ................... 310/12 |

FOREIGN PATENT DOCUMENTS

| DE | 41 37 201 A1 | 5/1993 |
|---|---|---|
| GB | 2319518 A | 5/1998 |

* cited by examiner

*Primary Examiner*—Frantz F. Jules
(74) *Attorney, Agent, or Firm*—Young & Thompson

(57) ABSTRACT

Transportation system comprising a large number of platforms which can be displaced along guides and a smaller number of displacement devices which can be coupled to and uncoupled from the said platforms. Each displacement device comprises a linear actuator comprising a moving part and a stationary part. The stationary part comprises a laminated plate assembly with coils, and the moving part comprises a structure with permanent magnets, such as neodymium magnets. On the linear actuator, there may be a further linear actuator, so that movement in two directions is possible. A transportation system of this type can be used in a parking garage for positioning vehicles.

14 Claims, 7 Drawing Sheets

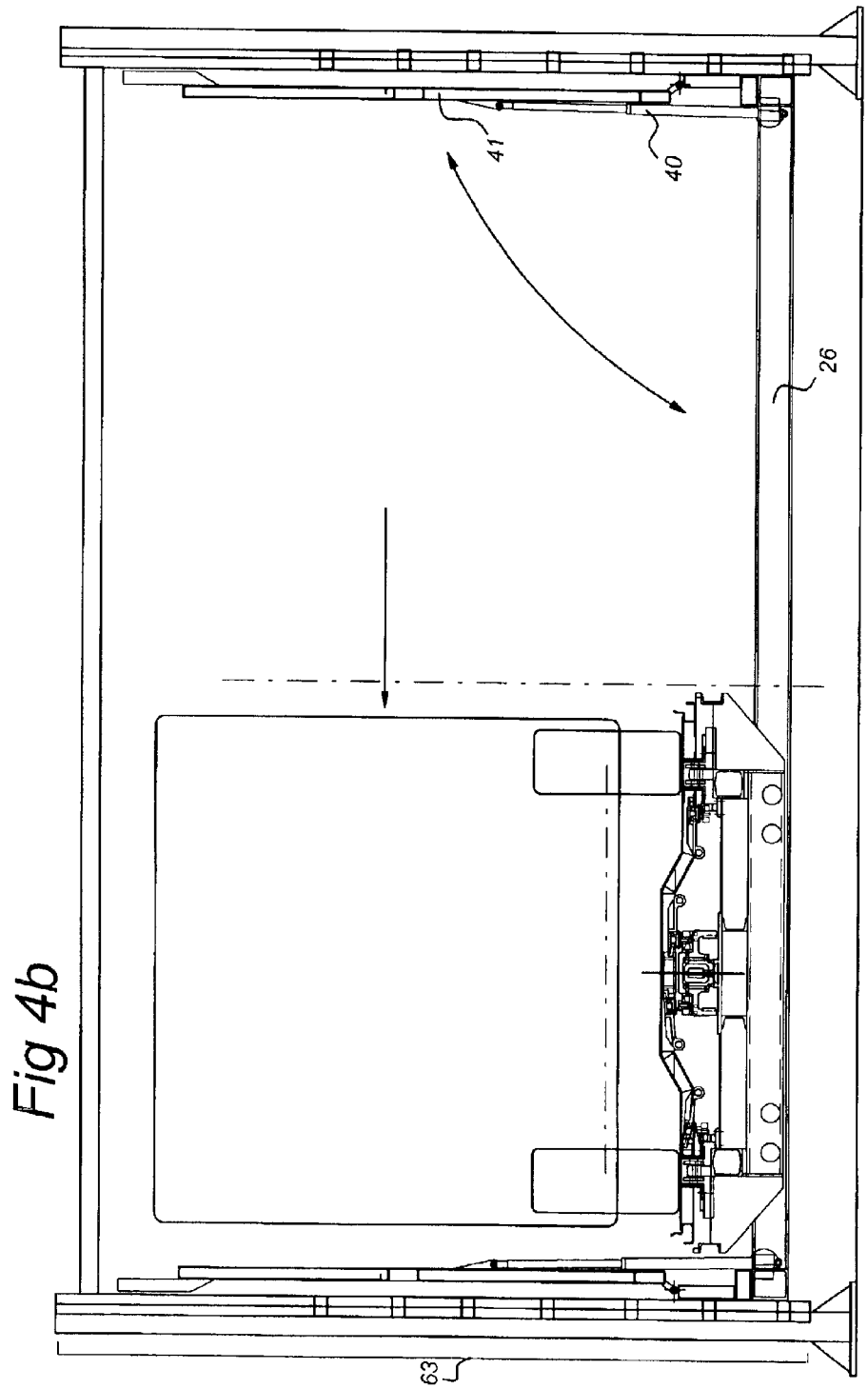

TRANSPORTATION SYSTEM WITH LINEAR MOTOR

FIELD OF THE INVENTION

The present invention relates to a transportation system comprising a number of platforms which can be moved along guides as well as a smaller number of displacement devices which can be coupled to and uncoupled from the said platforms.

A transportation system of this type can be used, for example, for moving vehicles within a parking garage. In this case, vehicles of this type are driven to a central location and, from there, are moved away to a storage location, and are transported back from the storage location to the central location or another central location.

However, it should be understood that the transportation system according to the invention also has other applications. Examples of these are the movement of objects in warehouses and factories. In this case, the transportation system may either be arranged on the floor or may be of overhead design, as is the case, for example, in slaughterhouses.

The object of the present invention is to provide an inexpensive system which requires little outlay both to procure and to maintain and is of particularly robust design.

SUMMARY OF THE INVENTION

In a transportation system as described above, this object is achieved in that said displacement devices comprise a linear actuator which comprises a moving part and a stationary part, both provided with means for generating a magnetic field, said means for generating a magnetic field for the moving part comprising coils which are accommodated in a laminated plate assembly, and said displacement devices being displaceable along further guides and being realised such that they can move under the said displaceable platforms in order to act thereon.

By using an electric linear actuator which is realised in the manner described above, it is possible to provide a particularly robust system which can be of relatively simple design.

According to an advantageous embodiment of the invention, the laminated plate assembly of the coils of the moving part comprises an elongate assembly, which extends in a first plane, designed for the coils to fit around, and at least three laminated plate assemblies which extend in a second plane, are each arranged adjacent to a coil and comprise a pole end, said second plane being substantially perpendicular to said first plane.

According to this variant, it is possible to produce the coil independently of the laminated plate assembly. As a result, it is easily possible to produce coils with an opening on an industrial scale, and for these coils then to be pushed onto the first laminated plate assembly. After a coil has been fitted, the second laminated plate assembly, which extends substantially perpendicular to the first laminated plate assembly, is fitted, after which another coil is fitted, etc. In this way, a structure which acts as the stator of a linear actuator can be obtained particularly quickly and efficiently.

The above process can be simplified still further if the coils are energized with the aid of a three-phase circuit Simple frequency converters can be used. If appropriate, there may be a circuit which, for example, allows the moving part to start up gradually. This moving part is preferably embodied with permanent magnets. More particularly, permanent neodynium magnets are used. These magnets have a particularly high coercive force. In this way, it is possible to obtain a particularly compact structure. In recent years, the cost price of permanent magnets of this type has fallen considerably, so that they are available even for simple applications.

It is possible for the entire path which is to be covered by the moving part to be provided with a stator provided with the coils described above. However, it is also possible to arrange series of coils of this type at periodic intervals. This is possible in particular if the length of the moving part is such that the space between two series of coils can be spanned by the moving part. After all, the greatest exchange of energy between moving part and stator takes place at the start and end of a path, i.e. during acceleration and deceleration. Less kinetic energy will be required in the intervening part.

According to a particular embodiment of a platform of this type, the platform is of rolling design and can be locked to an actuator. This actuator then positions the platform at the desired location, after which unlocking takes place and the actuator is moved back. The actuator can then be used to move another platform. The actuator may be arranged on a lift structure in order to transport the platform from a reception area to a storage level. Moreover, there may be a structure with further actuators, so that the platform can be moved in a direction which is perpendicular to the first direction of displacement. In this way, it is possible to make more effective use of the space available in a parking garage. One example of this is to be found in Dutch Patent Application 1015963 in the name of B. Tent.

If appropriate, there may be provided Hall sensors in order to determine the position of the moving part of the actuator with respect to the stationary part. In principle, Hall sensors of this type are not required, since the location at which the moving part is situated can be determined from the energy consumption of the various coils. However with simple frequency converters, it is possible to connect a number of groups of coils in series/parallel, with the result that the precise location of the moving part is no longer certain, and, in such a situation, sensors of this type are important in order to provide accurate control.

It will be understood that the structure described above is particularly maintenance-free, i.e. any initial higher installation costs are amply compensated for by the lower maintenance costs and the reduced risk of faults.

BRIEF DESCRIPTION OF THE DRAWINGS

The invention will be explained in more detail below with reference to an exemplary embodiment which is illustrated in the drawing, in which:

FIG. 2 shows a cross section through an actuator according to the invention, in a plane perpendicular to the axis along which FIG. 1 is exploded.

DETAILED DESCRIPTION OF THE INVENTION

Figure 1:
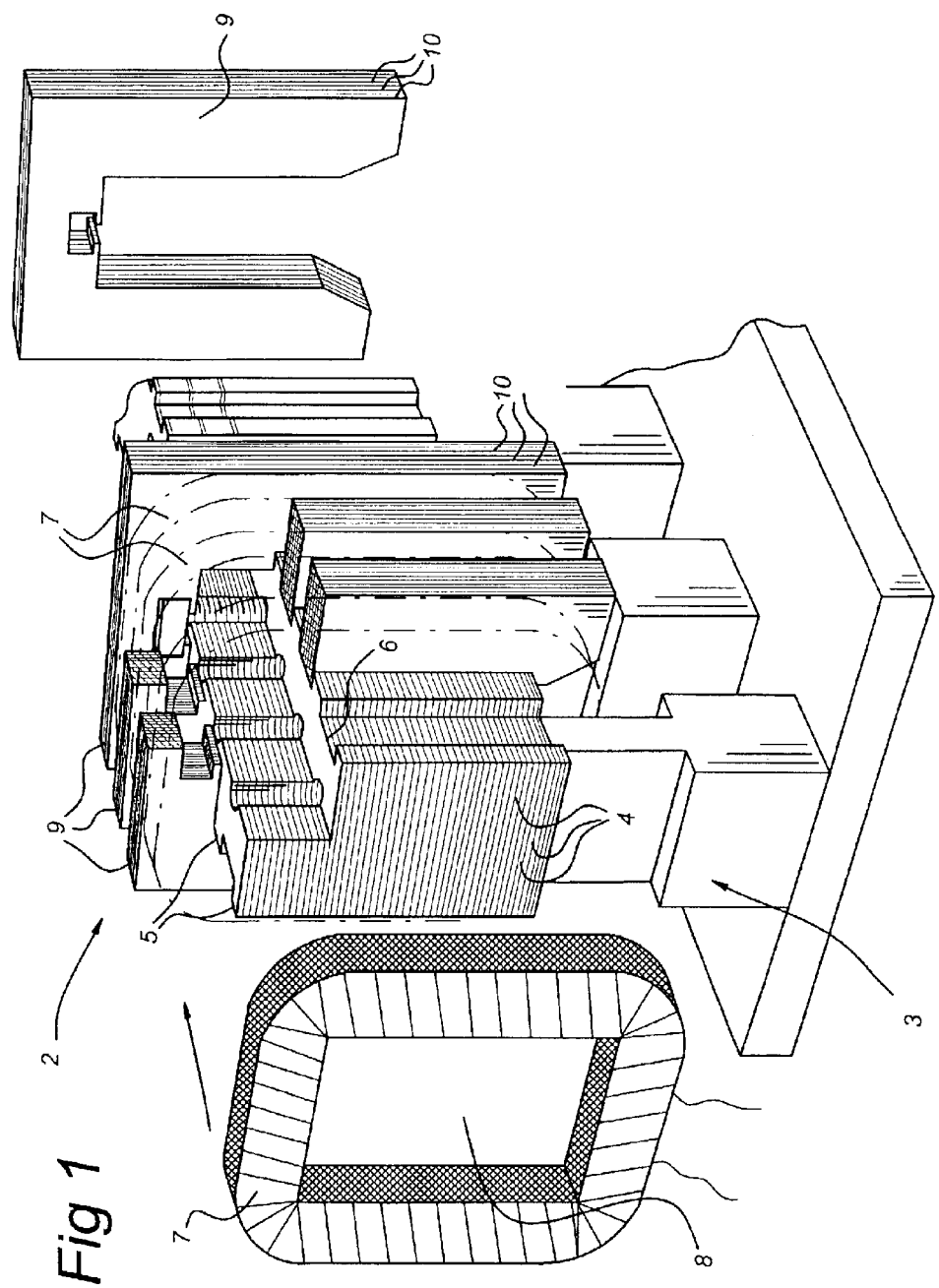
FIG. 1 shows a perspective, partially cut-away exploded view of the stator of an actuator according to the invention.

FIG. 1 shows the stator of a linear actuator. In the figures (FIG. 2 onwards), the linear actuator is denoted overall by 1. The stator is denoted by 2 in the figures. It comprises a laminated plate assembly 3 extending in the longitudinal direction. This assembly comprises a number of strips 4 which have been placed onto one another and are preferably produced from transformer plate with a thickness of, for example, 0.5 mm. As can be seen, the strips are in each case provided with projections 5 and recesses 6. A number of coils 7 (3 are shown) are present, with openings 8. Openings 8 are designed in such a manner that the coils can be pushed over the laminated plate assembly 3 in the longitudinal direction in a closely fitting manner. The coils are positioned at the projections 5. Laminated strip assemblies 9 are present, comprising a number of strips 10 which are likewise made from transformer plate and are of a suitable thickness. The opening delimited therein corresponds to the distance between opposite recesses 6, i.e. the laminated strip assembly 9 is enclosed in a tightly fitting manner within recesses 6, and between two laminated strip assemblies 9 there is in each case one coil. In the design shown here, the coils are energized using standard frequency conversion, and the coils are connected as a three-phase circuit (RST).

According to the invention, the laminated strip assembly 9 extends substantially perpendicular to the laminated plate assembly 3. The free ends of the laminated strip assembly 9 form the poles. This design can be implemented particularly easily and effectively without requiring any complicated operations. The coils may be standard coils which are wound separately from the magnet core structure, i.e. it is not necessary for the coils to be wound only after the laminated plate assembly has been assembled. This allows considerable cost savings to be achieved.

Figure 2:
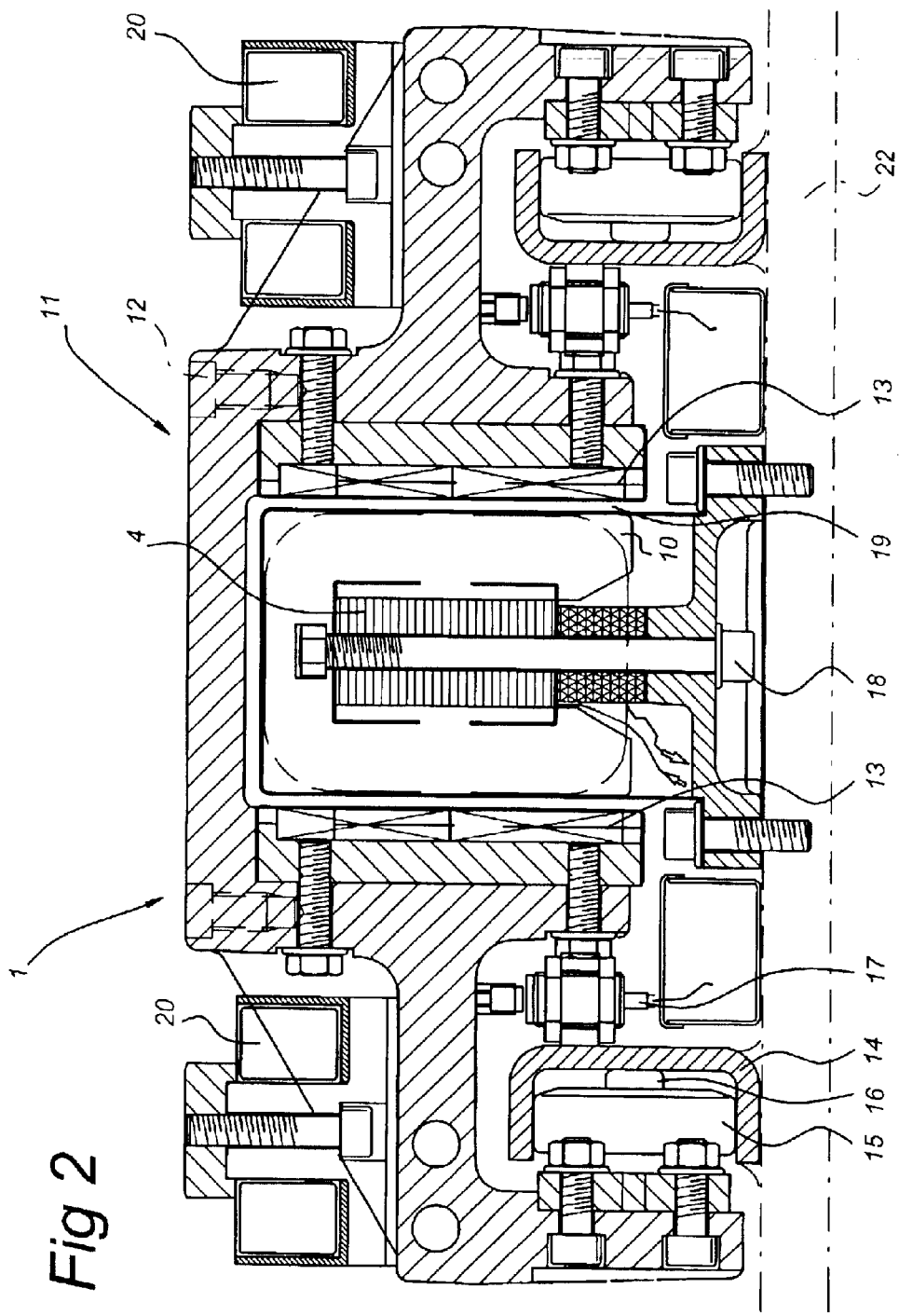

FIG. 2 shows stator 2 of the actuator 1 in combination with the moving-part thereof. It can be seen from FIG. 2 that the stator is attached to a support 22 with bolts 18. Two U-rails 14 are also attached to this support 22. Wheels 15, 16 are arranged therein. The wheels 15 provide vertical positioning, and the wheels 16 provide lateral positioning. These wheels are connected to the moving part 11, which substantially comprises a bridge frame 12. The moving part 11 has a considerable length, perpendicular to the plane of the drawing, and comprises a succession of permanent magnets which arm arranged alternately. All this will become clear with reference to FIG. 5. Permanent magnets 13 are arranged on this bridge frame 12. These permanent magnets may comprise neodynium magnets. Hall sensors which can be used to determine the position of the moving part with respect to the stator are denoted by 17. With the aid of the structure shown here, it is possible to accurately maintain the air gap 19 between the permanent magnets and the energized stator, so that the optimum effect is obtained.

Figure 3:
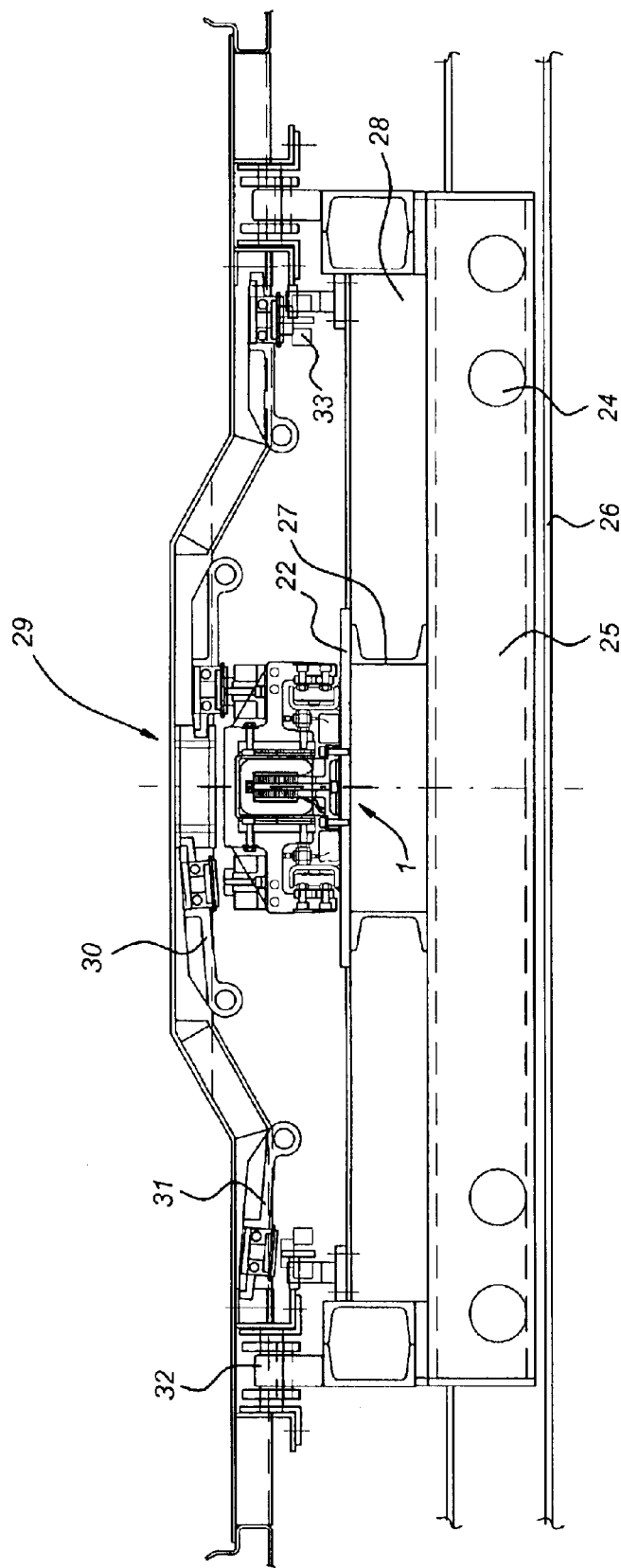
FIG. 3 shows a cross section in the same direction as FIG. 2, through a combination of the actuator according to the invention and a support structure.

FIG. 3 shows how the actuator 1 can be used in combination with a platform 29. With wheels 32, this platform rolls along beams 28 which, together with beams 27 to which the actuator is attached, are attached to a main carriage 25 which, in turn, rolls along a main rail 26 via diagrammatically illustrated wheels 24. In main carriage 25 there are two actuators, as will become clear from FIG. 6.

If appropriate, it is possible for the platform to be designed in such a manner that any liquids originating from a vehicle, such as oil or coolant, are collected at a central point and, with the aid of an automatically actuated shut-off valve in a defined storage position (preferably in the central area), are discharged to a drain arranged in the stationary part.

There may be means for damping the forces which occur when an acceleration and/or deceleration takes place on the support plate, as may occur when vehicles are driving on or off.

Locking arms 30 and 31 are present, by means of which the platform 29 can be connected to actuator 1. The presence of magnetizable coils 20, 33 allows engagement to be effected in this case, the design of the electromagnets associated with the locking arms 30 and 31 is such that, when voltage is applied, lock 31 moves downwards and is unlocked. The action of locking arm 30 is precisely the opposite, i.e. locking takes place when it moves downwards. Locks 31 are used for static parking of platform 29. Locks 30 are used for engagement with the linear actuator and moving platform 29 when coupled to the actuator.

Figure 4A:
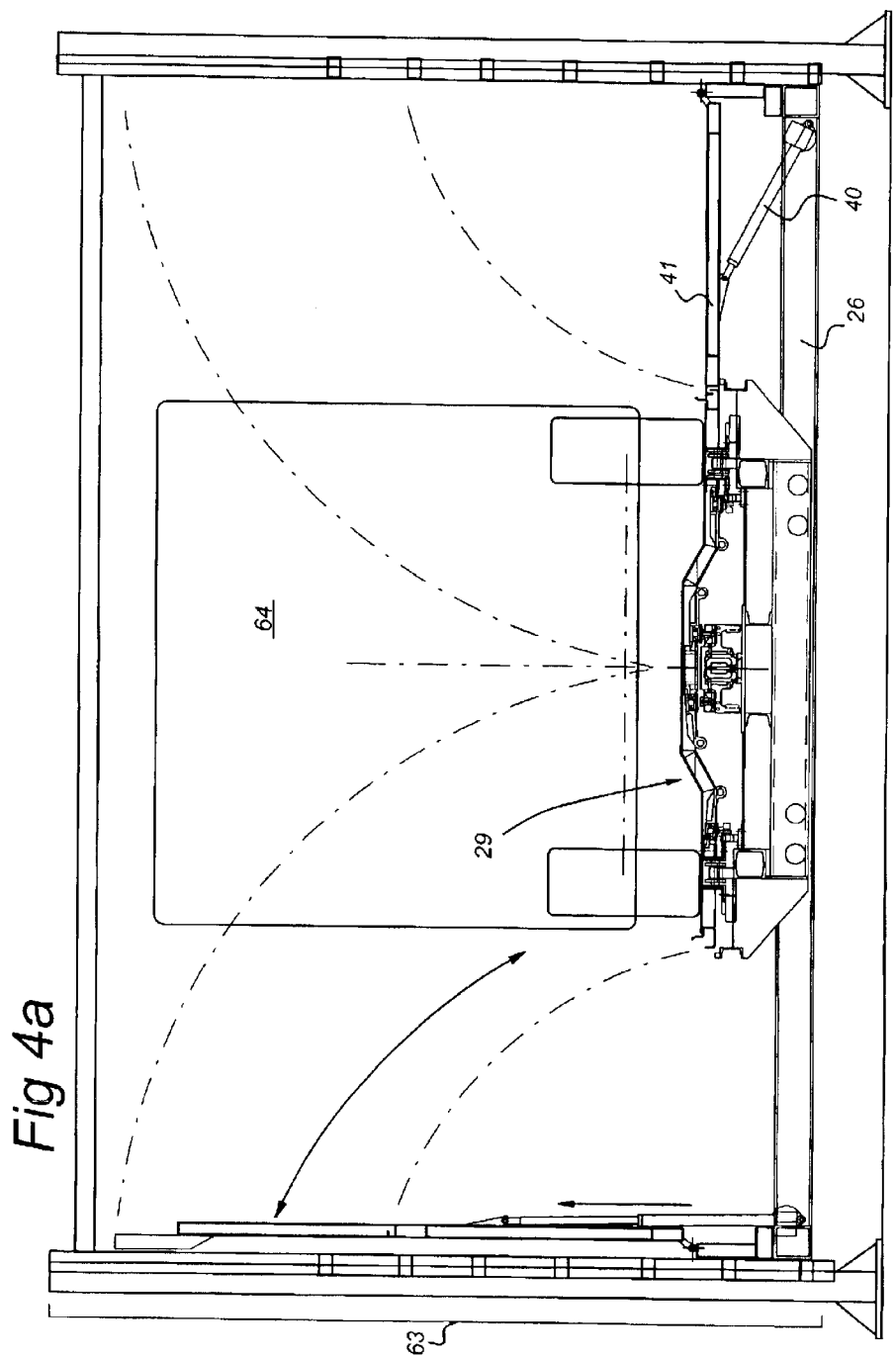
FIGS. 4a and b show combinations of the structure shown in FIG. 3 and a part of a parking garage in various positions.

FIG. 4 shows a lower part of a parking garage 60. Different positions are shown in FIG. 4a and FIG. 4b. The levels of this paring garage 60 are denoted by 61 and 62 in FIG. 7, while the ground floor is denoted by 63. On the ground floor there is a vehicle 64 which has been driven onto the platform 29 which has just been described. The platform 29 is laterally delimited by auxiliary floor parts 41 which can be folded up with the aid of a jack 40, as indicated diagrammatically in FIG. 4a. After at least one of the auxiliary floor parts has been folded up, carriage 25 can be moved along main rail 26. This is diagrammatically illustrated in FIG. 4b. Then, the structure comprising the main carriage 16 and what is above it can be moved upwards to level 61 or 62 (FIG. 7). This vertical transport can take place using a standard lift structure, although it is also possible to use an actuator corresponding to actuator 1 for this purpose.

Figure 5:
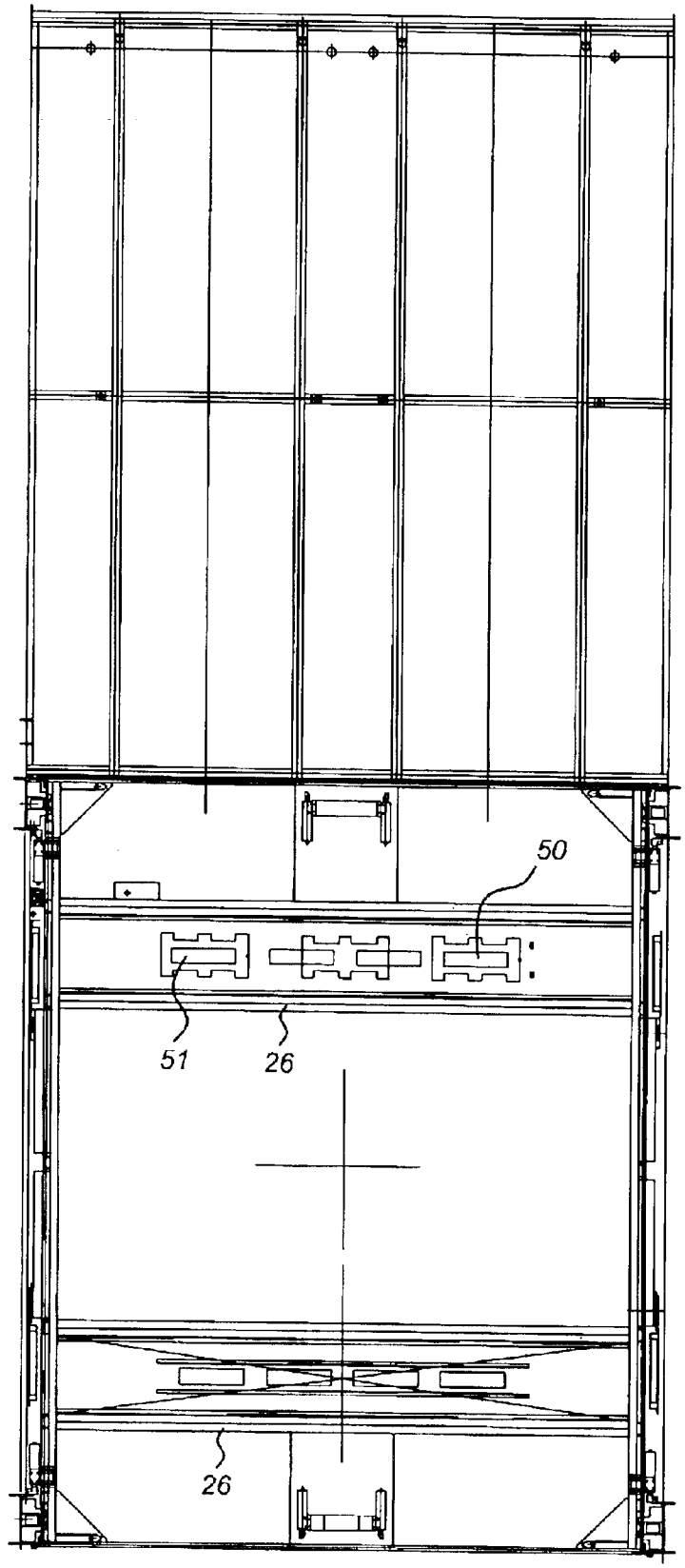
FIG. 5 shows a plan view of a part of the structure shown in FIG. 4.

The presence of two actuators 50, which are spaced from one another, in the main carriage 25 can be seen from FIG. 5. As a result, main carriage 25 can be moved with respect to rail 26. Each actuator comprises a number of series of coils, each series being denoted by 51. The length of the moving part of the actuator is such that, as it passes from one series to another, a number of permanent magnets are always acting on coils of both one series and the adjoining series. This allows the number of coils to be limited. Naturally, it is possible to use a continuous series.

Figure 6:
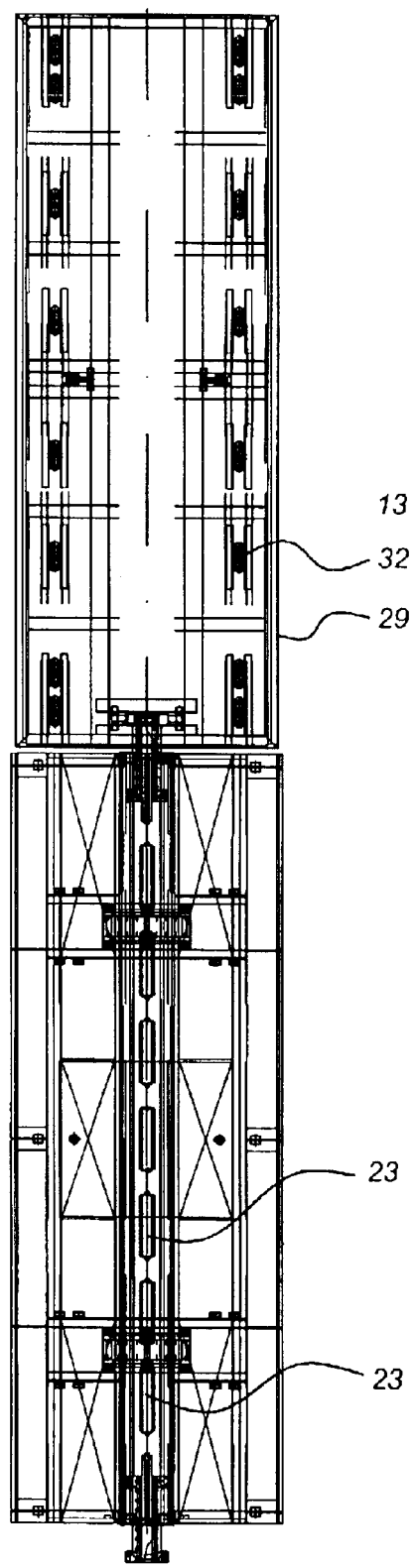
FIG. 6 shows a plan view of a part of the structure shown in FIG. 4.

FIG. 6 shows a plan view of the actuator 1. This too comprises a number of series of coils 23. Through actuation, it is possible, once platform 29 has arrived at level 61 or 62, to be moved away from the actuator. The wheels 32 then rest on I-sections of the relevant level. With the actuator 1, the platform 29 is moved completely onto the relevant level, and then the actuator can be moved to a different level with the aid of the lift in order to pick up a further platform 29 which is optionally provided with a vehicle.

The actuators described above can be controlled using any simple frequency controller. Expedient connection allows the number of special components to be limited as far as possible, so that the costs of a structure of this type remain limited. The relatively short time for which the various actuators are switched on means that it is not necessary to use a separate cooling system, while the efficiency of the actuators is also not of primary importance. Consequently, a simple and therefore inexpensive structure can suffice, so that considerable economic benefits can be achieved over conventional structures. The structure according to the invention is in principle maintenance-free.

As indicated above, the transportation system according to the present invention can also be used to transport other objects. The design will be adapted accordingly. It is also possible to couple a number of platforms to one another, in which case a single linear actuator drives a number of platforms. It is also possible to put together a train of platforms, in which case various linear actuators are arranged at a distance from one another. In a design of this type, the distance between the stationary parts of the linear actuators can be selected as a function of the expected distance between the moving parts of the actuators. Moreover, when the movement in the starting region of the train or single actuator with platform is relatively great, it is possible for there to be a relatively large number of stationary parts of the linear actuators, while in a part in which constant movement takes place there may be a smaller number, since the mass inertia means that it is easier to span the distance between two stationary parts of the linear actuators.

It will be understood that numerous modifications may be made depending on the use of the transportation system according to the present invention. The way in which the displacement device is guided may be adapted according to the particular use. Variants of this type are deemed to lie within the scope of the appended claims.

What is claimed is:

1. Linear actuator comprising a moving part to be moved along opposite rails and a stationary part, both provided with means for generating a magnetic field, said means for generating a magnetic field for the stationary part comprising coils which are accommodated in a laminated plate assembly, said moving part being provided with a bridge frame bridging said stationary part and provided with said means for generating a magnetic field and at opposite sides with wheels engaging said rails for positioning said moving part relative to said stationary part, wherein said displacement devices comprise at least three coils which are controlled as a three-phase circuit.

2. Linear actuator according to claim 1, in which the laminated plate assembly of the coils of the stationary part comprises an elongate assembly, which extends in a first plane, designed for the coils to fit around, and at least three laminated strip assemblies which extend in a second plane, are arranged in sandwich fashion with said strip assemblies alternating with said coils and comprise a pole end, the said second plane being substantially perpendicular to said first plane.

3. Linear actuator according to claim 1, in which the coils in said displacement devices comprise flat coils with a substantially rectangular central opening.

4. Linear actuator according to claim 1, in which said means for generating a magnetic field of the said moving part of said displacement devices comprise permanent magnets.

5. Linear actuator according to claim 1, in which said displacement devices comprise a number of stationary parts arranged at a distance from one another and various means for generating a magnetic field in said moving part, the distance between said stationary parts being shorter than the distance between said means for generating a magnetic field in said moving part.

6. Linear actuator according to claim 1, in which said further guide comprises a support plate provided with at least one further actuator (50) as set forth in one of the claims, of which the direction of action extends substantially perpendicular to the direction of action of the said actuator which is connected to the base, the said further actuator being connected to an auxiliary support.

7. Linear actuator according to claim 6, in which the said auxiliary support is provided with locking means and a secondary support which interacts with said locking means and can be brought into and out of engagement with said locking means.

8. Transportation system comprising a number of platforms which can be moved along guides as well as a smaller number of displacement devices which can be coupled to and uncoupled from the said platforms, said displacement device being displaceable along further guides and being realized such that they can move under said displaceable platforms in order to act thereon, characterized in that the said displacement devices comprise a linear actuator (1) comprising a moving part (11) and a stationary part (2), both provided with means (7, 13) for generating a magnetic field, said means for generating a magnetic field for the stationary part comprising coils which are accommodated in a laminated plate assembly (3, 9), said moving part (1) being provided with a bridge frame (12) bridging said stationary part (2) and provided with said means (13) for generating a magnetic field and with wheels (15, 16) for positioning said moving part relative to said stationary part, wherein said displacement devices comprise at least three coils which are controlled as a three-phase circuit.

9. Transportation system according to claim 8, in which the laminated plate assembly of the coils of the stationary part comprises an elongate assembly (3), which extends in a first plane, designed for the coils to fit around, and at least three laminated strip assemblies (9) which extend in a second plane, are arranged in sandwich fashion with said strip assemblies alternating with said coils and comprise a pole end, the said second plane being substantially perpendicular to said first plane.

10. Transportation system according to claim 8, in which the coils in said displacement devices comprise flat coils with a substantially rectangular central opening (8).

11. Transportation system according to claim 8, in which said means for generating a magnetic field of the said moving part of said displacement devices comprise permanent magnets (13).

12. Transportation system according to claim 8, in which said displacement devices comprise a number of stationary parts arranged at a distance from one another and various means for generating a magnetic field in said moving part, the distance between said stationary parts being shorter than the distance between said means for generating a magnetic field in said moving part.

13. Transportation system according to claim 8, in which said further guide comprises a support plate provided with at least one further actuator (50) of which the direction of action extends substantially perpendicular to the direction of action of the said actuator which is connected to the base, the said further actuator being connected to an auxiliary support.

14. Transportation system according to claim 13, in which the said auxiliary support is provided with locking means (20, 30, 31) and a secondary support which interacts with said locking means and can be brought into and out of engagement with said locking means.

* * * * *